United States Patent [19]
Boone

[11] 3,800,804
[45] Apr. 2, 1974

[54] DOUBLE OUTLET TRANSVERSE FAN

[75] Inventor: Jerry C. Boone, Independence, Mo.

[73] Assignee: Allis-Chalmers Corporation, Milwaukee, Wis.

[22] Filed: Feb. 5, 1973

[21] Appl. No.: 329,598

[52] U.S. Cl. .............................. 130/27 HF, 415/54
[51] Int. Cl. ............................................ A01f 12/44
[58] Field of Search ...... 130/27 HF, 26, 24; 415/54; 56/125

[56] References Cited
UNITED STATES PATENTS
| | | | |
|---|---|---|---|
| 875,550 | 12/1907 | McKorkell | 130/26 |
| 3,469,773 | 9/1969 | Pool et al. | 415/54 |
| 3,603,063 | 9/1971 | Stroburg | 130/27 HF |
| 3,664,349 | 5/1972 | Quick | 130/27 HF |

*Primary Examiner*—Antonio F. Guida
*Attorney, Agent, or Firm*—Charles L. Schwab

[57] ABSTRACT

A transverse fan for use in the cleaning and separating system of a combine harvester and wherein such transverse fan is provided with a splitter mechanism for dividing the air discharged by such fan into two streams, one used in conjunction with the separating portion of the combine and the other used in conjunction with the cleaning portion of such combine.

5 Claims, 2 Drawing Figures

DOUBLE OUTLET TRANSVERSE FAN

This invention is concerned with providing a combine harvester transverse fan with means for dividing the air being discharged by such fan.

An object of this invention is to provide means in a harvester having a transverse fan wherein such fan can be utilized for supplying the desired amount of air for both a separating operation and a cleaning operation where formerly two fans were used.

A further object of this invention is to provide means in a double outlet transverse fan for insperating debris collecting on a duct of such fan into the air stream to be blown out of the machine.

An object of this invention is to provide an economical, more efficient cleaning and separating mechanism for a combine and wherein such mechanism can be readily adapted for use in combines of different size.

It is a further object of this invention to provide a single small diameter fan to replace a pair of fans in a combine cleaning and separating mechanism and wherein with the intake air going into the fan across the full width thereof, such construction reduces the outlet distribution problems including simplifying the ducting problem.

Figure 1:
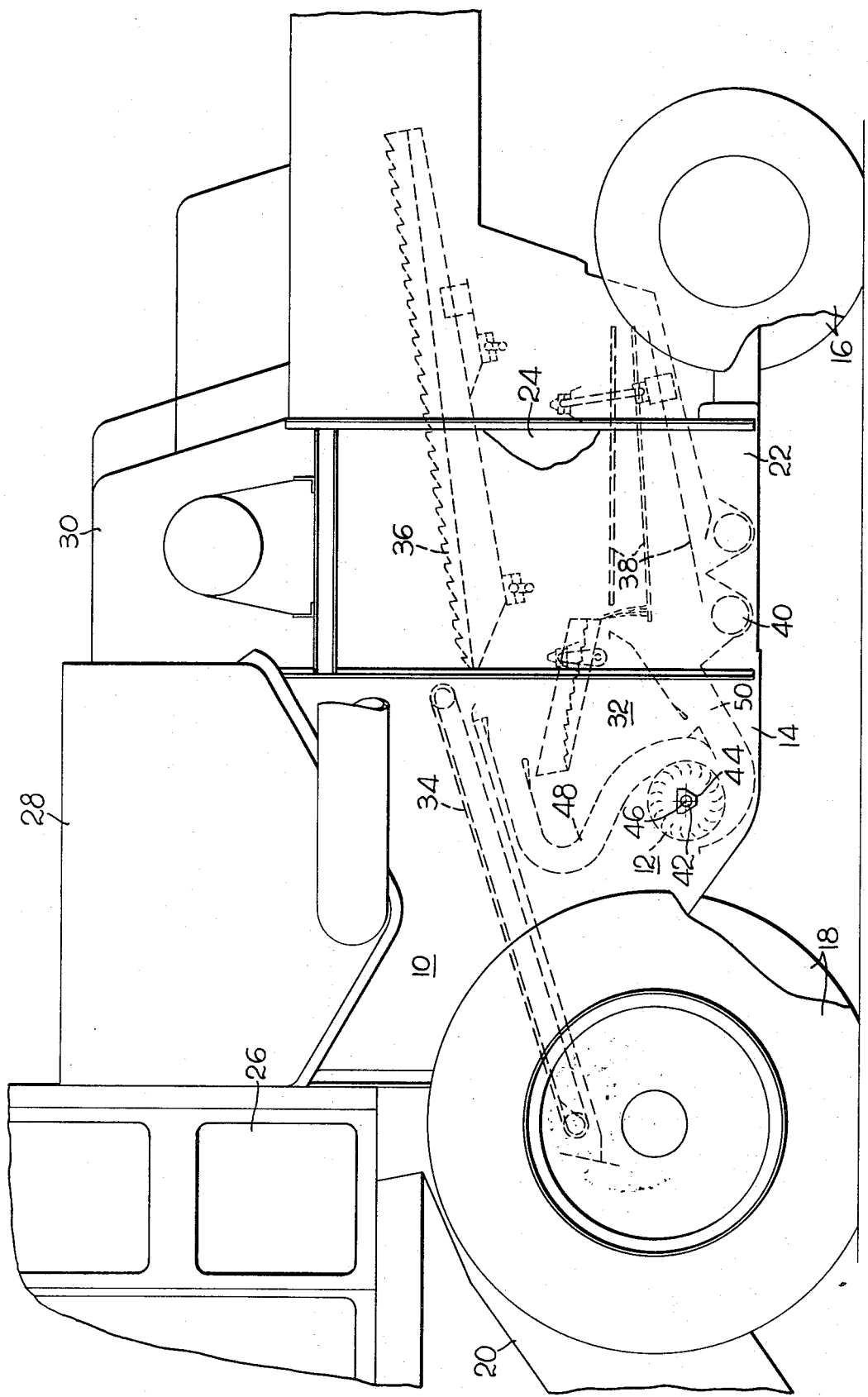
Figure 2:
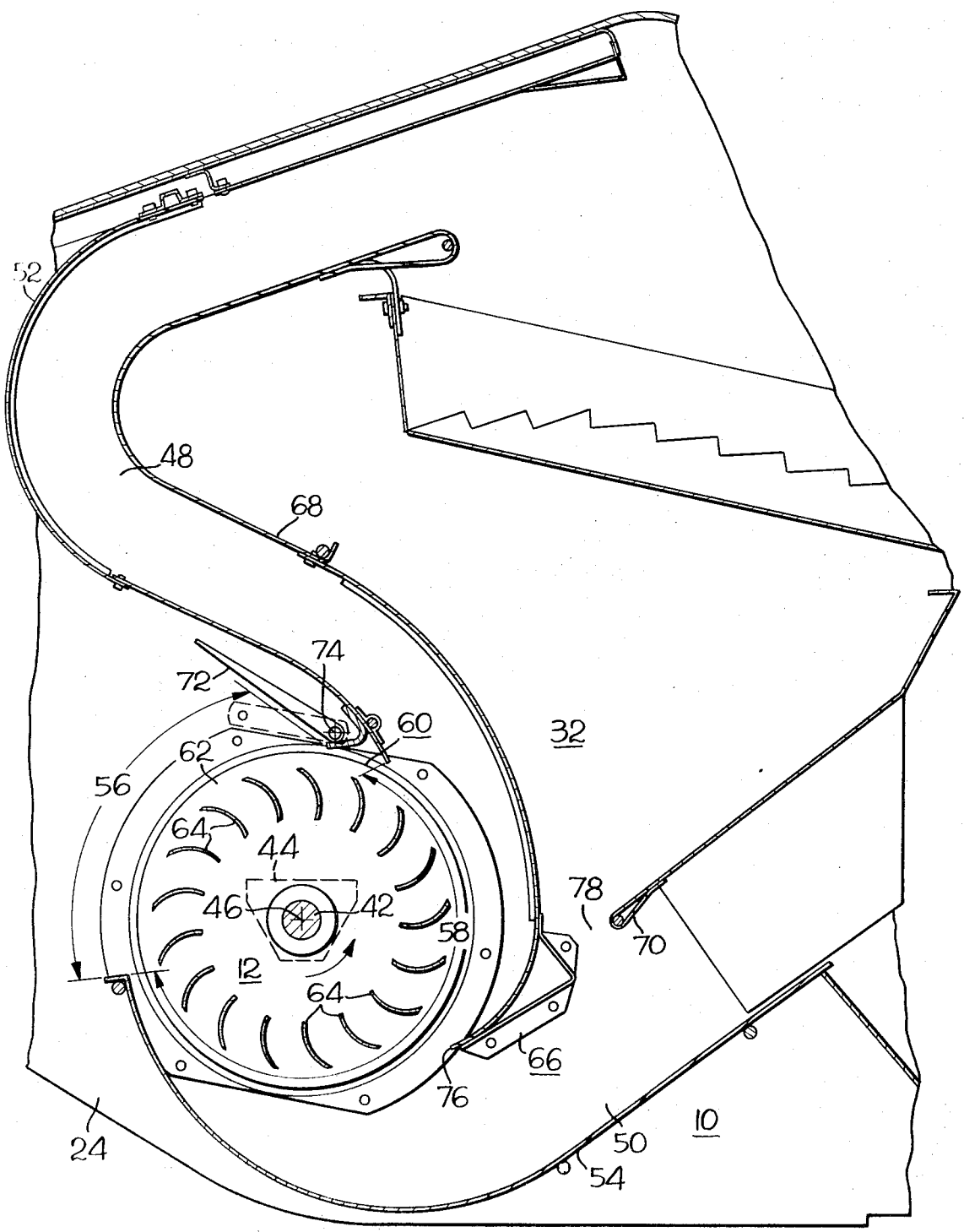

Other features and advantages will appear in the following description and appended claims, reference being had to the accompanying drawings forming a part of this specification, wherein:

FIG. 1 is a side elevation of a combine harvester embodying the invention with parts removed or broken away for clarity of illustration; and FIG. 2 is an enlarged portion of the cleaning and separating mechanism shown in FIG. 1.

Referring now to the drawings there is shown in FIG. 1 a side view of a combine harvester designated 10. A cleaning and separating fan 12 extends transversely across the lower portion of harvester 10 which includes a frame 14 supported at the rear on dirigible wheels 16 and supported at the front on drive wheels 18. Combine 10 is provided with a header 20, transversely spaced longitudinally extending sidewalls 22 and 24, an operator's station 26, a grain bin 28, an engine 30 and a separating and cleaning mechanism 32 all of which are carried by frame 14 to which these components are attached. A conveyor 34 carries grain and straw from a threshing cylinder (not shown) and discharges same on reciprocating straw rack 36. Reciprocating grain cleaning shoes 38 are positioned beneath rack 36 and deposit cleaned grain in auger 40 which conveys such grain to grain bin 28 by conventional means (not shown).

Cleaning and separating fan 12 is provide with a transversely extending central shaft 42. Sidewalls 22 and 24 are provided with bearing assemblies 44 which rotatable support shaft 42, and define a transverse fan axis 46. Fan 12 is provided with a separating duct 48 extending upwardly and ultimately rearwardly under conveyor 34 for passing a stream of air through material being delivered to straw rack 36 by conveyor 34. Cleaning duct 50 extends rearwardly and upwardly to direct a flow of air over cleaning shoes 38.

Referring now to FIG. 2 wherein an enlarged view of the cleaning and separating system 32 is presented, broken away from combine 10, this preferred embodiment of the invention includes transverse sections extending from sidewall 22 to sidewall 24 and being attached thereto and forming ducts 48 and 50. One of these transverse sections is section 52 which forms the upper surface of separator duct 48 and another of these transverse sections is the lower surface 54 of cleaner duct 50 The fan 12 also includes an air intake opening 56 positioned between the lower edge of upper section 52 of duct 48 and the lower section 54 of duct 50 and the remainder of the periphery of fan 12 forms an air discharge opening 58.

A drum-shaped rotary fan or blower wheel 60 is supported by bearing assemblies 44 for rotation about axis 46. The blower wheel 60 includes central shaft 42 mounted for rotation about axis 46 and a plurality of radially extending discs 62 secured thereto. Blower wheel 60 extends substantially the entire transverse distance between walls 22 and 24 and a disc 62 is positioned on shaft 42 at each end. Mounted on end discs 62 are a series of arcuate blades 64. These blades are mounted in the manner shown in copending application Ser. No. 294,479, filed Oct. 2, 1972 to which reference may be had if further details of blower wheel 60 are desired.

A transversely extending splitter assembly 66 extends from wall 22 to wall 24 and is attached thereto with the upper transverse section 68 of assembly 66 forming the lower surface of duct 48 and the lower transverse section 70 of assembly 66 forming the upper surface of duct 50.

The blower wheel 60 revolves in a counterclockwise direction as seen in FIG. 2 and in so doing draws air through opening 56 and causes it to be discharged through discharge opening 58 into ducts 48 and 50. A transversely extending choke vane 72 is mounted between sidewalls 22 and 24 of combine 10 for pivotal movement about a transverse axis 74. Choke vane 72 is coextensive with blower wheel 60 and is used to vary the amount of air entering opening 56.

Wheel 60 is driven by engine 30 at substantially constant speed through conventional means (not shown). Splitter assembly 66 forms at its lower end, a flow divider 76 for dividing the output air between ducts 48 and 50. Section 70 of cleaner duct 50 is provided with a transversal opening 78 through which chaff, dust or the like can be insperated by the air stream passing through duct 50 and discharged through the rear end of combine 10.

It should be noted that the splitter assembly 66 has its divider portion 76 positioned adjacent the periphery of fan 12 and approximately midway in discharge opening 58. Divider portion 76 is positioned in opening 58 at a point to provide ducts 48 and 50 with the desired percentage for each duct of the air being discharged through opening 58 and if a different percentage of air is desired, assembly 66 can be repositioned about axis 46 to present divider 76 at the desired location.

The embodiments of the invention in which an exclusive property or privelege is claimed are defined as follows:

1. A combine having longitudinally extending transversely spaced sidewalls, a transverse fan for producing a wide air stream for use in a combine cleaning and separating system; said cleaning and separating system including a straw rack and underlying cleaning shoes, horizontally aligned bearings mounted in said sidewalls and providing a transverse axis of rotation for said fan, transverse sections extending from one sidewall to the other; said transverse sections including an upper duct section arranged at an acute angle to the horizontal, a lower duct section arranged at an acute angle to the horizontal, said lower duct section originating adjacent the periphery of said fan and below and forwardly of said transverse fan axis, said upper duct section originating adjacent the periphery of said fan and above and rearwardly of said transverse fan axis; a splitter assembly interposed between said duct sections and extending from sidewall to sidewall to provide a first duct formed from said upper duct section, said splitter assembly and said sidewalls directing a percentage of the air from said fan to said straw rack; and a second duct formed from said lower duct section, said splitter assembly and said sidewalls directing a percentage of the air from said fan to said cleaning shoes underlying said straw rack; and a drum-shaped blower wheel extending substantially from one sidewall to the other, said blower wheel being mounted for rotation in said bearings within said sidewalls and adapted to draw air into said fan through the forward side thereof and discharge such air in uniform streams rearwardly through said first and second ducts.

2. In the combination recited in claim 1 and wherein the forward end of said splitter assembly is positioned adjacent to the periphery of said fan and rearwardly thereof.

3. In the combination recited in claim 2 and wherein the forward end of said splitter assembly is mounted at a height less than the height of said axis.

4. In the combination recited in claim 3 and wherein the position of the forward end of said splitter assembly in said discharge opening can be adjusted to vary the percentage of air being handled by the ducts.

5. In the combination recited in claim 4 and wherein a transverse opening is provided in said splitter assembly so that foreign matter landing on the splitter assembly will be insperated into the air stream of the cleaner duct.

* * * * *